United States Patent
Wang et al.

(10) Patent No.: US 6,978,338 B2
(45) Date of Patent: Dec. 20, 2005

(54) PCI EXTENDED FUNCTION INTERFACE AND PCI DEVICE USING THE SAME

(75) Inventors: Hsin-Min Wang, Hsinchu (TW); Huan-Tang Hsieh, Hsinchu (TW); Chang-Lien Wu, Hsinchu (TW); Jen-Che Tsai, Hsinchu (TW)

(73) Assignee: Realtek Semiconductor Corp. (TW)

( * ) Notice: Subject to any disclaimer, the term of this patent is extended or adjusted under 35 U.S.C. 154(b) by 353 days.

(21) Appl. No.: 10/100,758

(22) Filed: Mar. 19, 2002

(65) Prior Publication Data

US 2002/0133651 A1 Sep. 19, 2002

(30) Foreign Application Priority Data

Mar. 19, 2001 (TW) .......................... 90106306 A

(51) Int. Cl.[7] .............................................. G06F 13/20
(52) U.S. Cl. ...................... 710/313; 710/10; 710/300
(58) Field of Search ...................... 710/10, 100, 300, 710/313

(56) References Cited

U.S. PATENT DOCUMENTS

| | | | | |
|---|---|---|---|---|
| 5,960,213 A | * | 9/1999 | Wilson | 710/2 |
| 5,987,590 A | * | 11/1999 | Wing So | 712/35 |
| 6,023,736 A | * | 2/2000 | Lambeth et al. | 710/10 |
| 6,073,253 A | * | 6/2000 | Nordstrom et al. | 714/25 |
| 6,170,048 B1 | * | 1/2001 | Wing So | 712/35 |
| 6,675,251 B1 | * | 1/2004 | Streitenberger et al. | 710/306 |

* cited by examiner

Primary Examiner—Tim Vo

(57) ABSTRACT

The present invention discloses a PCI extended function interface and PCI device using such an interface. The PCI extended function interface is suitable for use in a PCI device comprising a master device and at least one slave device. The PCI extended function interface comprises at least one connecting port and a first circuit. The slave device is coupled to a corresponding connecting port and the PCI extended function interface transmits a control signal through the connecting port to control the operation of a corresponding slave device. The first circuit is used to determine the configuration space.

4 Claims, 3 Drawing Sheets

| 31 | | 16 | 15 | | 0 | |
|---|---|---|---|---|---|---|
| Device ID | | | Vendor ID | | | 00h |
| Status | | | Command | | | 04h |
| Closs Code | | | | Revision ID | | 08h |
| BIST | Header Ttpe | | Latency Timer | Cache Line Size | | 0Ch |
| Bass Address Register | | | | | | 10h 14h 18h 1Ch 20h 24h |
| Cardbus CIS Pointer | | | | | | 28h |
| Subsystem ID | | | Subsystem Vendor ID | | | 2Ch |
| Expansion ROM Bass Address | | | | | | 30h |
| Reserved | | | | Capabilities Pointer | | 34h |
| Reserved | | | | | | 38h |
| Max_Lat | Min_Gnt | | Interrupt Pin | Interrupt Pin | | 3Ch |

FIG. 1

PCI EXTENDED FUNCTION INTERFACE AND PCI DEVICE USING THE SAME

BACKGROUND OF THE INVENTION

1. Field of the Invention

The present invention generally relates to a PCI interface and a PCI device, and more particularly, to a PCI extended function interface and a PCI device that uses such a PCI interface.

2. Description of the Prior Art

The configuration space in an integrated circuit (IC) is used to provide the IC on the state-of-the-art PCI (Protocol Control Information) device with the supported functions and the related information. However, the information, especially related to the supported functions, included in the configuration space is usually unchangeable. Therefore, when a plurality of IC's that support different functions are desired to be installed in a PCI device, a PCI bridge is required to be established between two IC's. It follows that a signal is firstly transmitted to a first IC in the PCI device when the PCI host (or arbitrator) requires a certain function. If the required function is not provided by the IC, the signal is transmitted through the PCI bridge on the PCI device to the next IC.

Even though such a design allows a PCI device to provide various functions, however, there still exist some problems. To begin with, since the content of the configuration space is usually unchangeable, a PCI bridge is required to serve as a medium between two IC's. Secondly, the cost for circuit design as well as fabrication will increase, since lots of PCI bridges may be required in a multi-functional PCI device.

In view of this, the present invention provides a PCI extended function interface and a PCI device that uses such a PCI interface. By employing the PCI extended function interface for the PCI device of the present invention, the content of the configuration space is thus changeable. The PCI device using such an extended function interface allows a reduced complexity in the PCI design by changing the content of the configuration space, which can do without the PCI bridges between IC's and further reduce the cost for circuit design as well as fabrication.

SUMMARY OF THE INVENTION

Accordingly, it is the primary object of the present invention to provide a PCI extended function interface, which is suitable for use in a PCI device comprising a master device and at least one slave device. The PCI extended function interface comprises at least one connecting port and a first circuit. The slave device is coupled to a corresponding connecting port and the PCI extended function interface transmits a control signal through the connecting port to control the operation of a corresponding slave device. The first circuit is used to determine the configuration space of the PCI device such that the master device is able to interact properly with the slave device through the extended function interface.

The extended function interface is characterized in that: (1) the content of the configuration space of the master slave is properly arranged by using the first circuit or the connecting ports corresponding to the respective slave devices; and (2) if necessary, the extended function interface has an arbitrating function to ensure that the master device and the respective slave devices operate properly to become the bus master.

It is another object of the present invention to provide a PCI device using the PCI extended function interface, in which the PCI device comprises a master device and at least one slave device. The master device comprises an extended function interface and a PCI interface logic circuit. The slave device comprises a PCI interface logic circuit. The extended function interface has a connecting port corresponding to a respective slave device. The extended function interface controls the corresponding slave device through the connecting port.

It is still another object of the present invention to provide a PCI device using the PCI extended function interface, in which the PCI device comprises an extended function interface and a configuration device. The extended function interface has a connecting port corresponding to a respective slave device and the extended function interface controls the corresponding slave device through the connecting port. The configuration device defines a define bit that determines whether the PCI device is a single-functional device or a multi-functional device and determines the function number corresponding to the function of the PCI device. The content of at least one of the define bit and the function number is changeable.

Accordingly, the present invention makes the design of PCI devices more flexible by determining the content of the configuration space in the IC's. The function number is used to determine the required function such that the PCI bridge in the prior art is no more needed as a medium for signal transmission, which significantly reduce the complexity as well as the fabrication cost.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits and advantages of the preferred embodiment of the present invention will be readily understood by the accompanying drawings and detailed descriptions, wherein:

FIG. 1 shows a data type in the configuration space in an integrated circuit of a PCI device;

DETAILED DESCRIPTION OF THE INVENTION

The present invention providing a PCI extended function interface and a device using such an interface can be exemplified by the preferred embodiment as described hereinafter.

Please refer to FIG. 1, which describes a data type in the configuration space register in an integrated circuit of a PCI device. The stored data in the four bytes 0Ch, 0Dh, 0Eh and 0Fh are the parameters such as the cache line size, the latency timer, the header type and the build in self-test (BIST), respectively. The header type stored in 0Eh is used to represent the arrangement of the parameters in the pre-defined header. The MSB (bit 7, the defining but) in the header type is used to determine whether the PCI device is a single-functional device or a multi-functional device. For example, if the MSB is "0", the PCI device is a single-functional device; if the MSB is "1", the PCI device is a multi-functional device.

Figure 2:
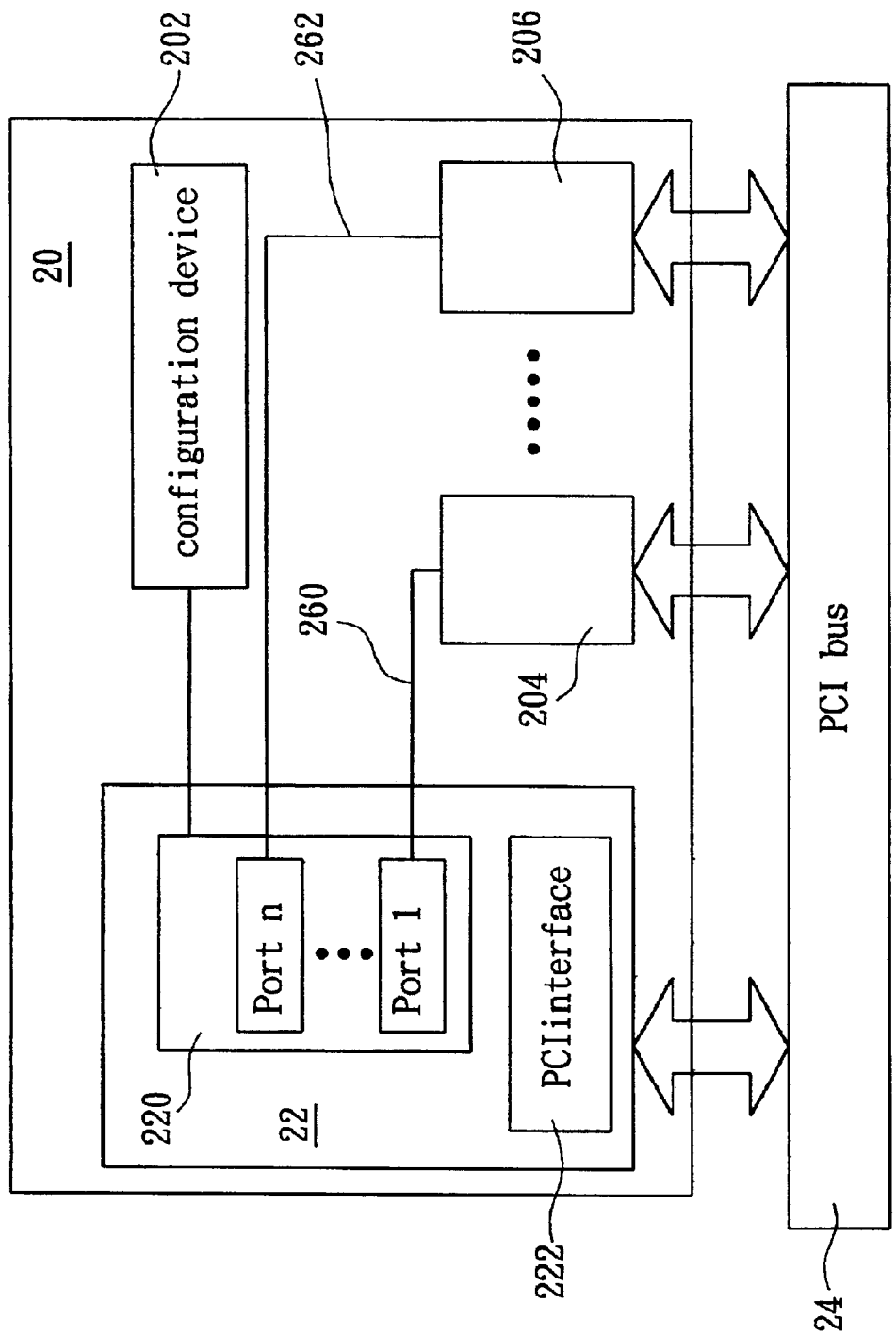
FIG. 2 is a block circuit diagram in accordance with one embodiment of the present invention.

Please further refer to FIG. 2, which is a block circuit diagram in accordance with one embodiment of the present invention. The PCI device 20 comprises a master device 22 and a plurality of slave devices 204, 205 and 206. As shown in FIG. 2, the master device 22 further comprises a PCI interface 222 for communication between the master device 22 and the PC bus. Each of the slave devices 204, 205 and 206 may also comprise a PCI interface for communication with the PC bus. For simplification, the PCI interfaces in the slave devices are omitted in this application but the present invention is not thus limited. In addition, the master device 22 further comprises an extended function interface 220. In the extended function interface 220, each of the connecting ports (Port 1~Port n) is provided to be connected to a corresponding slave device from 204 to 206, respectively. More particularly, the PCI extended function interface 220 transmits various control signals through Port 1 and a signal transmission line 260 to control the slave device 204. Similarly, the PCI extended function interface 220 transmits various control signals through Port n and a signal transmission line 262 to control the slave device 206. Certainly, if a slave device can be configured to respond to a certain function number, the corresponding connecting port can be omitted. The control signals for controlling the slave devices 204, 205 and 206 generally include REQ (the REQuest signal), GNT (the GraNT signal), IDSEL (the Initialization Device SELect signal) and so on.

When one of the slave devices 204, 205 and 206 is used as the bus master, the corresponding signal transmission line should be able to transmit REQ, GNT and IDSEL for control. When one of the slave devices 204, 205 and 206 is not used as the bus master, the corresponding signal transmission line can be designed more flexibly. For example, when the slave device 204 is used as the bus master, the signal transmission line 260 should be able to transmit REQ, GNT and IDSEL such that the PCI extended function interface 220 can control the bus master through Port 1. On the other hand, when the slave device 206 is not used as the bus master, there are various ways for the design of the signal transmission line 262. One of these designs does not employs REQ and GNT, which means that the signal transmission line 262 only transmits IDSEL. In another design, the signal transmission line 262 is designed to comprise three channels to transmit the three signals, but the potentials of the channels for REQ and GNT are fixed at a constant value.

Moreover, the PCI device 20 further comprises a configuration circuit 202 for providing the operation parameters for the PCI device 20. For example, these operation parameters include the cache line size, the latency timer, the header type, the build in self-test (BIST) and the input sources for providing modified values of the operation parameters. Such a configuration circuit 202 can serve as a storage device for storing the pre-determined values for the operation parameters or a hardware circuit that can change the outputs according to the external input signals.

Figure 3:
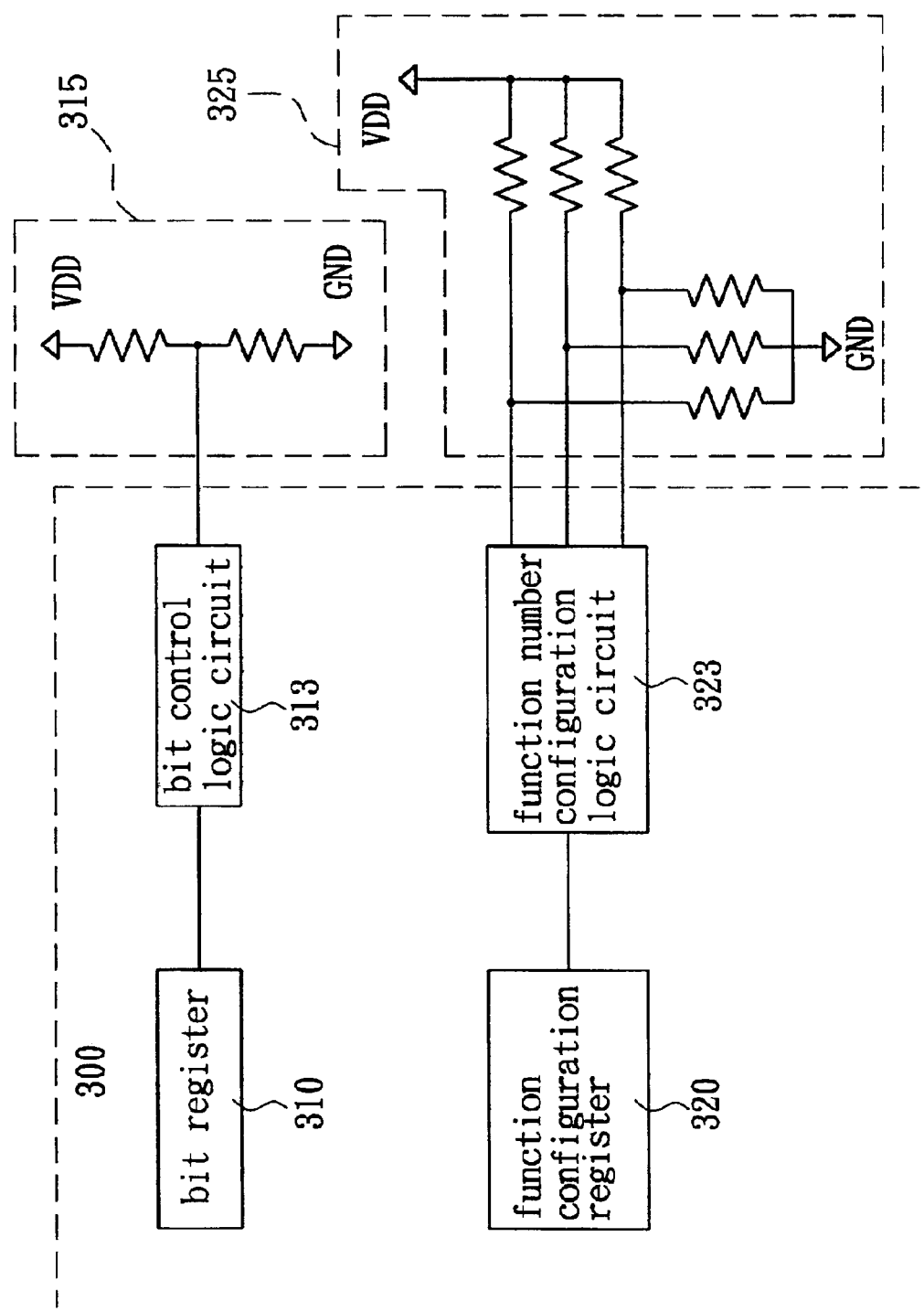
FIG. 3 is a block circuit diagram for determining the configuration space in accordance with another embodiment of the present invention.

Please refer to FIG. 3, which is a block circuit diagram for determining the configuration space in accordance with another embodiment of the present invention. In the PCI extended function interface 300, a bit register 310 is used to store the define bit values in the header type in the configuration space. Therefore, when the define bit value is "0", the PCI device is a single-functional device; when the define bit is "1", the PCI device is a multi-functional device. A function configuration register 320 stores a function number corresponding to a function the PCI device provides. In the present embodiment, a PCI host (not shown) or an arbitrator (not shown) reads the value stored in the bit register 310 and thereby determines whether the PCI device is a single-functional device or a multi-functional device. When the PCI device 20 is determined to be multi-functional, the PCI host assigns a desired function in a configuration cycle according to one or more bits of the address data.

For example, if the PCI device supports various functions, the bit value stored in the bit register 310 is "1". When the PCI device comprises one or more single-functional devices (such as the slave devices 204 to 206 shown in FIG. 2), the function configuration register 320 stores a function number corresponding to one of these devices. In the configuration cycle, the PCI host assigns a desired function in an address signal, for example, AD[10:8], and then the function number assigned by the address signal can be decoded and compared to the function number stored in the function configuration register 320. If the compared value is equal to the function number, it shows that the desired function is provided by the corresponding device.

Furthermore, in the present embodiment, the configuration comprises a bit configuration logic circuit 315 and a function configuration logic circuit 325. The bit configuration logic circuit 315 comprises two resistors electrically coupled to VDD and GND, respectively. The function configuration logic circuit 325 comprises a plurality resistor pairs, each including two resistors connected in series between VDD and GND. It is noted that the circuit design is not limited and any modification can be made by those who are skilled in the art according to practical uses. In the present embodiment, the value stored in the bit register 310 is determined by a bit control logic circuit 313 according to the voltage provided by the bit configuration logic circuit 315. The function number stored in the function configuration register 320 is determined by a function number configuration logic circuit 323 according to the voltage provided by the function configuration logic circuit 325.

Certainly, the present invention is not limited to the implemented circuit as shown in FIG. 3. As mentioned, the configuration device can be a storage device, for example, an electrically erasing and programming read only memory (EEPROM). The required operation parameters can be provided or modified by reading the data stored in the storage value. Those who are skilled in this art can design the circuit freely according to the practical cases.

According to the above description, the present invention provides a PCI extended function interface and a PCI device using the extended function interface, where the PCI device includes various functions such that the present invention provides more flexibility and reduces the fabrication cost. Therefore, the present invention has been examined to be progressive, advantageous and applicable to the industry.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A PCI device comprising:

a master device for performing a first function, the master device comprising a PCI interface for communicating the master device with a PCI bus, and an extended function interface having at least one connecting port; and a configuration device, for determining a define bit defining said PCI device to be one of a single-functional device and a multi-functional device;

wherein said define bit is changeable.

2. The PCI device of claim 1, wherein said configuration device is a storage device or a hard-wired circuit.

3. The PCI device of claim 1, wherein said configuration device is coupled to the master device.

4. The PCI device of claim 1, further comprising at least one slave device for performing a second function, wherein when the slave device is coupled to the connecting port, the define bit indicates that the PCI device is a multi-functional device.

* * * * *